United States Patent [19]

Jalan et al.

[11] 4,137,373
[45] Jan. 30, 1979

[54] PLATINUM CATALYST AND METHOD FOR MAKING

[75] Inventors: Vinod M. Jalan, Manchester; Calvin L. Bushnell, Glastonbury, both of Conn.

[73] Assignee: United Technologies Corporation, Hartford, Conn.

[21] Appl. No.: 854,285

[22] Filed: Nov. 23, 1977

[51] Int. Cl.$^2$ .................. B01J 21/18; B01J 23/42
[52] U.S. Cl. ............................ 429/44; 252/425.3; 252/447
[58] Field of Search .............. 429/44, 45; 252/425.3, 252/447

[56] References Cited

U.S. PATENT DOCUMENTS

| 2,358,359 | 9/1944 | Stuart | 252/447 X |
| 3,311,505 | 3/1967 | Paget et al. | 429/45 |
| 3,881,957 | 5/1975 | Hausler | 429/44 X |
| 4,028,274 | 6/1977 | Kunz | 252/425.3 X |

*Primary Examiner*—Patrick Garvin
*Attorney, Agent, or Firm*—Stephen E. Revis

[57] ABSTRACT

The rate of platinum recrystallization of a platinum supported on carbon catalyst is reduced and the activity of the catalyst is increased by depositing porous carbon on and around the supported platinum crystallites and then heating the catalyst in an inert atmosphere or vacuum at a high temperature.

15 Claims, 3 Drawing Figures

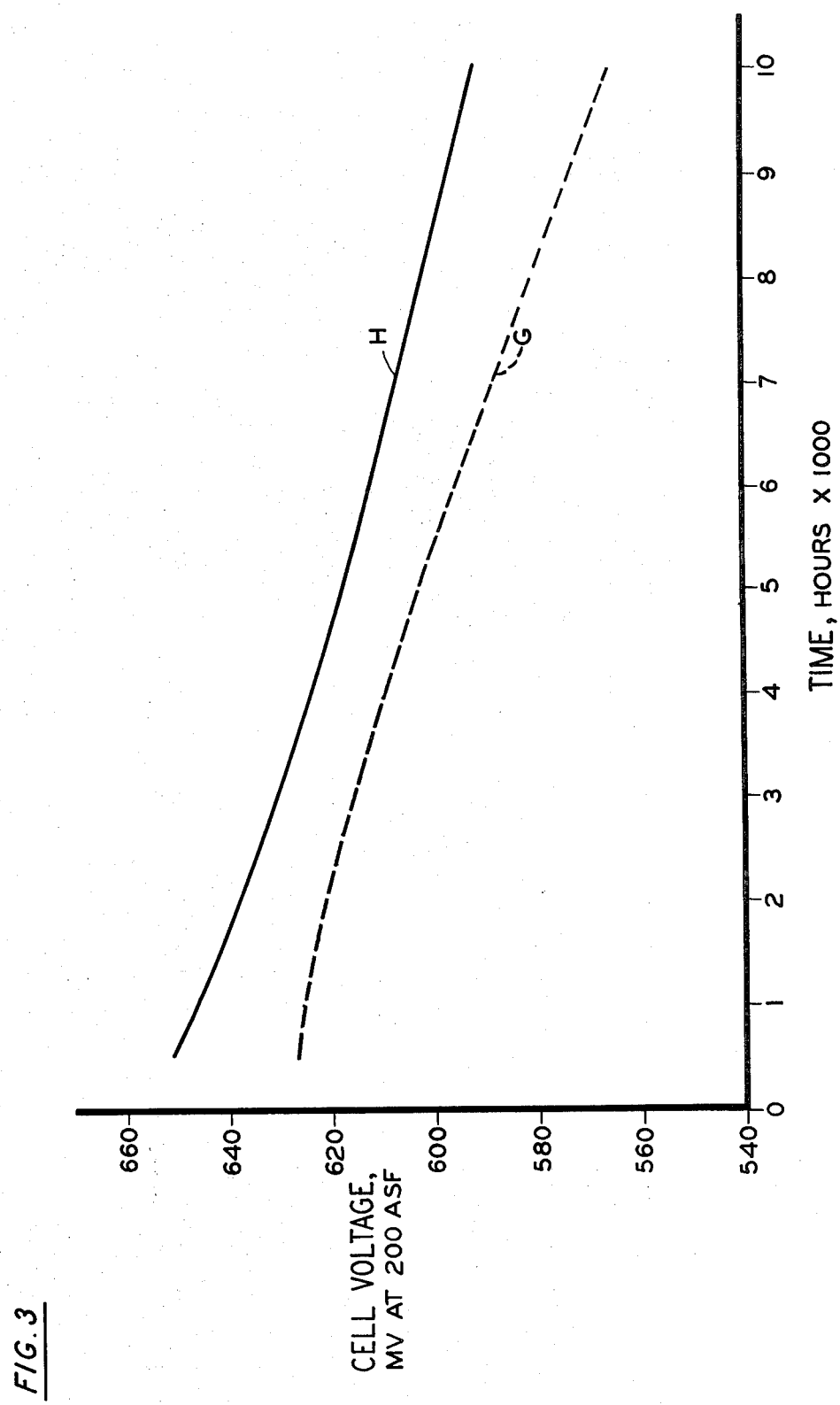

PLATINUM CATALYST AND METHOD FOR MAKING

RELATED APPLICATIONS

The following commonly owned applications were filed on even date with the present application and include related subject matter:

U.S. Ser. No. 854,284 entitled "Improved Catalyst and Method for Making" by V. Jalan and C. Bushnell;

U.S. Ser. No. 854,283 entitled "Fuel Cell Electrode With Improved Catalyst" V. Jalan and C. Bushnell, now abandoned; and U.S. Ser. No. 854,286 entitled "Fuel Cell Electrode With Improved Platinum Catalyst" by V. Jalan and C. Bushnell, now abandoned.

BACKGROUND OF THE INVENTION

1. Field of the Invention

This invention relates to a platinum catalyst and more particularly to a platinum catalyst supported on carbon particles.

2. Description of the Prior Art

Platinum is a well-known catalyst used in electrochemical cells. Electrode performance in a cell is directly related to the amount of surface area of platinum which can be reached by the various reacting species within the cell. This fact, coupled with the high cost of platinum, has resulted in considerable effort to get platinum into a usable form which has maximum surface area per unit weight of platinum. The basic approach has been, and still is, to put the platinum on the surface of suitable particles called supports. Carbon particles and graphite particles are common platinum supports in the fuel cell art. Several known techniques exist for depositing small platinum particles on such supports. For example, the support can be dispersed in an aqueous solution of chloroplatinic acid, dried, and exposed to hydrogen. Some other techniques are described in U.S. Pat. Nos. 3,857,737 to Kemp et al, 3,440,107 to Barber, 3,470,019 to Steele, and 3,532,556 to Steele.

By these techniques platinum crystals may be dispersed on the surfaces of the support particles so as to provide a high surface area of platinum.

When carbon supported platinum is used at temperatures of greater than 100° C in the presence of a liquid (or at higher temperatures in the presence of a gas) it has been found to lose surface area. This loss of surface area is particularly pronounced in an acid fuel cell environment, such as in fuel cells using phosphoric acid as the electrolyte, which operate at temperatures anywhere from 120° C and higher. The loss in surface area is dramatic during the first few hours of cell operation, but it continues at a slow but steady rate for a considerable period thereafter. A loss in cell performance is directly attributable to this loss in platinum surface area.

One method for reducing this loss of surface area is described in commonly owned U.S. Pat. No. 4,028,274 to Harold R. Kunz. In that invention the surfaces of graphitized carbon support particles were oxidized in the presence of a metal oxidizing catalyst to form pits in the surfaces of the particles. The metal oxidizing catalyst was then removed and the platinum was deposited on the oxidized particles. Based on the theory that during use of the catalyst the platinum crystallites migrate over the surface of the carbon and combine with other platinum crystallites (i.e., recrystallizing) thereby losing surface area, it was felt that the pits in the surface of the support material would hold the platinum crystallites more securely in place thereby reducing migration and loss of surface area. While this method was an improvement over the prior art, it was not totally satisfactory and continued efforts have resulted in the improved method of the present invention.

SUMMARY OF THE INVENTION

Accordingly, it is an object of the present invention to make an improved platinum supported on carbon catalyst, and more particularly to make an improved fuel cell electrode using this catalyst.

Another object of the present invention is to reduce recrystallization of platinum supported on carbon by reducing the migration of the platinum over the surface of the carbon support particles during subsequent use of the catalyst, such as in a fuel cell.

According to the present invention a method for improving a catalyst of platinum crystallites supported on carbon comprises the steps of depositing carbon on and around the platinum crystallites and then heating the catalyst in an inert atmosphere or vacuum to a high temperature.

It has been found that a catalyst made by the methods described herein and used as an electrode catalyst in a phosphoric acid fuel cell has improved recrystallization properties in that the rate of loss of catalyst specific surface area during fuel cell operation is significantly reduced; additionally the catalyst has an initially higher activity as compared to prior art platinum catalysts, the activity remaining higher than the prior art catalysts during use.

Commonly owned U.S. patent applications having U.S. Ser. Nos. 854,284 and 854,283 (now abandoned) by V. Jalan and C. Bushnell filed on even date herewith describe methods for depositing carbon on and around carbon supported platinum crystallites. As explained in those applications, it is believed that the porous carbon deposited on and around the platinum crystallites tends to more securely "set" the platinum crystallites in position on the carbon support particle thereby significantly reducing the crystallites ability to migrate over the surface of the carbon support particle during use in a fuel cell. By reducing the rate of migration the rate and extent to which recrystallization occurs is significantly reduced. We have found, quite unexpectedly, that if the catalysts made according to the foregoing applications are further heat treated in an inert atmosphere or vacuum to within the temperature range of 1500° F to 2250° F and if the temperature is held within that range for one-half to six hours the resulting catalyst recrystallizes to an even lesser extent. Additionally, and even more surprising, is that the activity of the platinum itself is increased by this high temperature heat treatment. This increase in platinum activity appears to be unrelated to the fact that platinum recrystallization in the fuel cell is also reduced.

The method for depositing the porous carbon on and around the platinum crystallites prior to the high temperature heat treatment does not appear to be critical to the present invention; however, a preferred method is to heat a supported platinum catalyst in the presence of carbon monoxide gas such that the carbon monoxide decomposes in the vicinity of the platinum crystallites (which act as a decomposition catalyst) to deposit carbon thereon and therearound. Other methods for depositing porous carbon are hereinafter disclosed; but the carbon monoxide method is preferred because of its simplicity and low cost. Basically, all of the methods described herein for depositing the porous carbon involve heating the catalyst in the presence of a carbonaceous compound to decompose the compound thereby forming porous carbon deposits on and around the platinum crystallites. This does not mean, however, that other techniques for depositing carbon would not work.

The foregoing and other objects, features, and advantages of the present invention will become more apparent in the light of the following detailed description of preferred embodiments thereof as illustrated in the accompanying drawing.

BRIEF DESCRIPTION OF THE DRAWING

FIG. 3 is a graph illustrating the improved catalytic activity of a catalyst made in accordance with the present invention.

DESCRIPTION OF THE PREFERRED EMBODIMENTS

Figure 1:
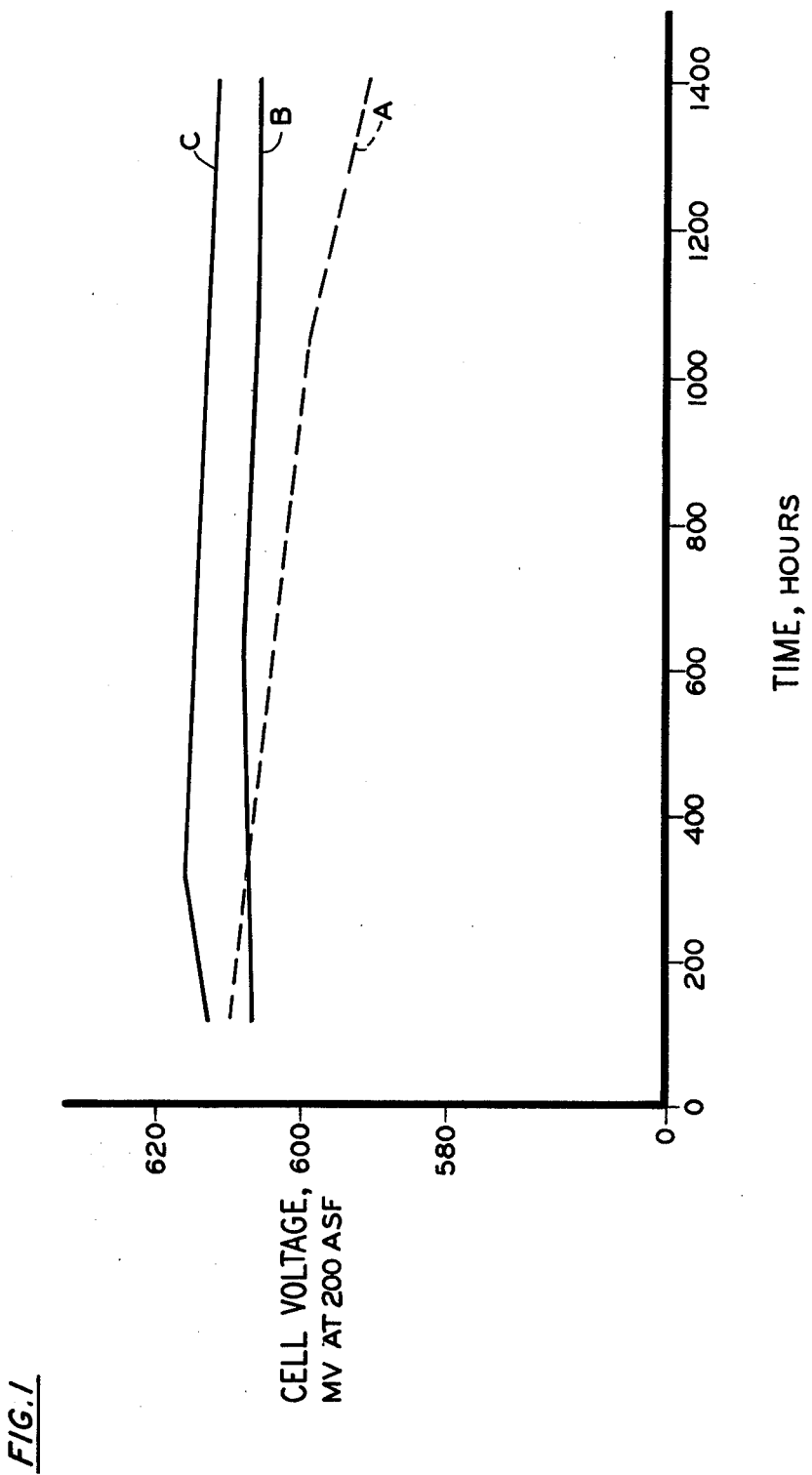
FIG. 1 is a graph showing the improved fuel cell performance attained by subjecting a platinum supported on carbon catalyst to a carbon monoxide heat treatment but not the high temperature heat treatment step of the present invention.

Methods for Depositing Porous Carbon On and Around the Platinum Crystallites of a Supported Platinum Catalyst The following methods for depositing porous carbon on and around the platinum crystallites of platinum supported on carbon catalyst are the same methods as described in the above mentioned U.S. patent applications Ser. Nos. 854,284 and 854,283 (now abandoned). The test data presented in Tables I, II, and III below are the same test data as is presented in those applications. The data presented in those tables does not reflect the advantages obtained by the present invention since the electrodes tested were not subjected to the high temperature heat treatment of the present invention after the carbon was deposited. It is believed, however, that the optimum manner of applying the carbon deposits, as described herein and in the aforementioned copending patent applications will also produce the best results with regard to the present invention.

A preferred method for depositing porous carbon on and around the platinum crystallites of carbon supported platinum catalyst is to heat the catalyst to within the temperature range of 500° F to 1200° F in a carbon monoxide atmosphere. The platinum crystallites act as a catalyst to the decomposition of the carbon monoxide as represented by the following formula:

$$2CO + \text{heat} \rightarrow C + CO_2 \quad (1)$$

Since without the presence of platinum the carbon monoxide will not decompose within this temperature range, the carbon is only deposited on and around the platinum crystallites. The heat treatment temperature range is coordinated with the time that the catalyst is held within that temperature range. The critical considerations are to make sure that the carbon deposits are sufficiently heavy to significantly reduce platinum migration, while at the same time they are not so dense and thick such that during use of the catalyst the reactant gas and/or liquid cannot easily reach the platinum crystallites. In other words the carbon deposits must be porous such that the performance of the catalyst does not suffer to such an extent that the benefits of the present invention are nullified.

Since it was not possible to calculate the optimum thickness or porosity of the carbon being deposited, a number of catalyst samples were made using various temperatures and times. Electrodes were made with these samples using standard techniques. Table I below presents a sampling of the data obtained. The electrode performance data are from subscale cell tests using two inch by two inch cathodes with a catalyst loading of 0.25–0.50 mg/cm$^2$ of electrode surface. A conventional anode was used. The catalyst support material was a high surface area carbon black. The electrolyte in these tests was phosphoric acid and the reactants air and hydrogen.

TABLE I
EFFECT OF CO TREATMENT TEMPERATURE AND TIME ON PLATINUM SURFACE AREA AND INITIAL PERFORMANCE IN H$_3$PO$_4$ FUEL CELL

| Catalyst # | Treatment (temps are ±25°F.) | Initial Cathode Potential mv at 200 ASF | Pt Surface Area m$^2$/gm | |
|---|---|---|---|---|
| | | | Initial | 100 hr |
| 1* | none | 680–687** | 120–140** | 40–50 |
| 2 | 5 min at 500° F | 682–691** | 139 | 46 |
| 3 | 10 min at 500° F | 680–691** | 125 | 53 |
| 4 | 15 min at 500° F | 685 | — | — |
| 5 | 60 min at 500° F | 686 | 113 | 51 |
| 6 | 60 min at 500° F | 686 | 120 | 62 |
| 7 | 5 min at 700° F | 687 | — | — |
| 8 | 10 min at 700° F | 695 | 131 | 64 |
| 9 | 10 min at 700° F | 695 | 131 | 66 |
| 10 | 15 min at 700° F | 683 | — | — |
| 11 | 30 min at 700° F | 678 | — | — |
| 12 | 5 min at 1500° F | 621 | — | — |

*Control catalyst—i.e., no CO treatment.
**Wherever a range is given it is the result of several tests using the same catalyst.

From these tests and other information relating to heat treatment of supported platinum catalyst, it is estimated that benefits will be observed if the heat treating temperature is within the range of 500° F to 1200° F, and if the temperature is held within this range for from one to sixty minutes. Obviously, the higher the heat treating temperature, the shorter the time the temperature should be maintained, and vice versa. From past experience it is known that temperatures in excess of about 1200° F result in excessive thermal sintering of the platinum during the heat treating. In other words, the high temperature in and of itself would cause significant migration of the platinum crystallites during the carbon monoxide treatment, resulting in an increase in platinum crystallite size which may eliminate any benefits which might otherwise have been obtained. A preferred heat treating temperature range is estimated to be 500° F to 800° F, the temperature being held within the range for five to thirty minutes. Best results were obtained by heating to a maximum temperature of about 700° F and holding at that temperature for about 10 minutes.

FIG. 1 shows a graph wherein time in a fuel cell is plotted on the horizontal axis and fuel cell performance in terms of cell voltage is plotted on the vertical axis. The curves are plotted from actual data. The curve A is from a cell using untreated catalyst, such as catalyst #1 from Table I. The curves B and C are from cells using catalyst which had been carbon monoxide treated at 700° F for 10 minutes. Note that although differences in initial performance were not meaningful, the treated catalysts were clearly superior over the long term as a result of smaller platinum surface area losses with time.

Carbonaceous gases or vapors other than carbon monoxide may also be used in practicing the present invention. For example, a hydrocarbon gas such as methane, acetylene or ethylene may be used as well as benzene, hexene, or heptane which should be used in the form of a vapor. The following formulas represent the reactions which occur for two of these materials:

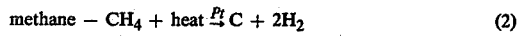

$$\text{methane} - CH_4 + \text{heat} \xrightarrow{Pt} C + 2H_2 \quad (2)$$

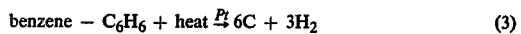

$$\text{benzene} - C_6H_6 + \text{heat} \xrightarrow{Pt} 6C + 3H_2 \quad (3)$$

As with carbon monoxide, tests would have to be run for each gas to develop optimum heat treatment temperature ranges and the length of time that the temperature would have to be held within those ranges. A limited number of samples were made under a variety of conditions. Examples of some electrode test data using these samples is presented in Table II below. Electrode size, catalyst loading and other aspects of the fuel cell tests were the same as described above with regard to Table I.

TABLE II
PERFORMANCE AND SURFACE AREA DATA FOR HYDROCARBON TREATED CATALYST

| Catalyst # | Treatment | Initial Cathode Potential mv at 200 ASF | Pt Surface area $m^2/gm$ | |
|---|---|---|---|---|
| | | | Initial | 100 hr |
| 13* | none | 680–687** | 140 | 43 |
| 14 | Hexene, 5 min at 680° F. | 672–583** | 133 | 54 |
| 15 | Benzene, 5 min at 800 min | 680 | — | — |

*Control catalyst--i.e., no CO treatment.
**Wherever a range is given it is the result of several tests using the same catalyst.

While these tests prove that the carbon may be deposited using a variety of gases and vapors, not enough testing was done to develop preferred and optimum heat treatment conditions for these materials.

In yet another method for depositing porous carbon, a carbon supported platinum catalyst was soaked for 15–30 minutes in an aqueous solution of about 10 weight percent $C_{11}H_{22}O_{11}$ commonly known as sucrose. The catalyst was then dried at a low temperature to remove the water, leaving a coating of sucrose over the entire catalyst particle. The coated catalyst was then heated in an inert atmosphere (a vacuum could have been used) to decompose the sucrose according to the following formula:

$$C_{11}H_{22}O_{11} + \text{heat} \rightarrow 11C + 11H_2O \quad (4)$$

This leaves porous carbon deposits over all areas of the catalyst including on and around the platinum crystallites as well as simply on the carbon support material. As in the other embodiments, the carbon which is deposited on or around the platinum crystallites serves the purpose of reducing migration of the platinum crystallites in accordance with the teachings of the present invention. Carbon which is deposited elsewhere on the support does no harm since the catalyst support material is already carbon. Table III displays test data for electrodes comprising catalyst made using the sucrose decomposition method. Electrode size, catalyst loading and other aspects of the fuel cell tests were the same as described above with regard to Table I.

TABLE III
PERFORMANCE AND SURFACE AREA DATA FOR SUCROSE TREATED CATALYST

| Catalyst # | Treatment | Initial Cathode Potential mv at 200 ASF | Pt Surface Area $m^2/gm$ | | |
|---|---|---|---|---|---|
| | | | Initial | 100 hr | 400 hr |
| 16* | none | 685 | 140 | 56 | 43 |
| 17 | 30 min at 920° F. | 685 | 110 | 70 | 58 |
| 18 | 30 min at 1100° F. | 681 | — | — | — |

*Control catalyst--i.e., no CO treatment.

For benefits to be observed it is estimated the sucrose decomposition heat treatment temperature should be between 800° F and 1200° F and that the temperature should be held within this range for from one-half to six hours. In general, the temperature need only be maintained until all of the sucrose is converted to carbon. As the carbon is being deposited, if the temperature exceeds 1200° F excessive thermal sintering of the platinum during the sucrose decomposition step may occur and defeat the purpose of the present invention, which is to maintain small platinum crystallite sizes. Temperatures less than 800° F will not completely carbonize the sucrose. It is believed that any soluble organic material which will decompose to carbon upon heating may be used for the purpose of practicing the present invention. Sucrose is one such soluble organic material. Examples of others are phenolic resins, cellulose, and polyvinyl alcohol. Once the carbon has been deposited by any of the foregoing methods, the further high temperature heat treatment step (hereinafter described) of the present invention may be accomplished without fear of excessive thermal sintering.

High Temperature Heat Treatment Step

Having deposited the porous carbon on the platinum crystallites such as by one of the foregoing methods or any other suitable method, the catalyst is then subjected to a high temperature heat treatment in an inert atmosphere or vacuum. Tests were conducted to determine the optimum heat treatment conditions. Some of the test data is presented below in Table IV. Electrode size, catalyst loading and other aspects of the fuel cell tests were the same as described above with regard to Table I.

Catalyst #19 was the control catalyst and did not receive any treatment. Carbon was not deposited prior to the high temperature heat treatment in the case of catalysts numbered 20 and 22; this, too, was for the purpose of judging the effectiveness of the present invention. All of the remaining catalysts were subjected to a 700° F carbon monoxide treatment for ten minutes prior to heat treating in an inert atmosphere or vacuum to the indicated temperature.

In all of these tests the heat treatment in an inert atmosphere or vacuum was carried out by heating the catalyst sample from room temperature to the maximum heat treatment temperature at the rate indicated in the second column of the table. The time indicated in column 4 of the table is counted from the moment the temperature reaches 1650° F. For example, at 370° F per hour catalyst #21 would be heated from 1650° F to 2150° F in one hour and 20 minutes. The remaining time of the two and one-half total time would be at 2150° F. Catalyst samples 27 and 29 were simply heated to 1650°

F at the rate indicated and held at 1650° F for one hour. Catalyst #24 was heated up to 1650° F at a rate of 200° F/hr and then to 1900° F at a rate of 400° F/hr.

material which hold the platinum particles and further reduce migration and recrystallization upon use of the catalyst in the fuel cell.

TABLE IV

EFFECT OF CATALYST HEAT TREATMENT ON INITIAL CATHODE PERFORMANCE IN $H_3PO_4$ FUEL CELL (Except as noted all catalysts were subjected to 10 minutes CO treatment at 700° F. prior to heat treating.)

| Catalyst # | Rate of Heating (° F/hr) | Maximum Heat Treatment Temperature (° F) | [a]Heat Treatment Time (hours) | Heat Treatment Atmosphere | Initial Cathode Potential (mv at 200 ASF) |
|---|---|---|---|---|---|
| 19* | — | — | — | — | 685 |
| [b]20 | 375 | 2150 | 2.5 | $N_2$ | 630 |
| 21 | 375 | 2150 | 2.5 | $N_2$ | 680 |
| [b]22 | 300 | 1741 | 1.0 | $N_2$ | 680 |
| 23 | 300 | 1741 | 1.0 | $N_2$ | 710 |
| 24 | [c]200/400 | 1900 | 1.0 | $N_2$ | 690 |
| 25 | 200 | 1750 | >6.0 | $N_2$ | 674 |
| 26 | 200 | 1680 | 2.0 | $N_2$ | 695 |
| 27 | 200 | 1650 | 1.0 | $N_2$ | 710 |
| 28 | 200 | 1760 | 1.0 | $N_2$ | 701 |
| 29 | 300 | 1650 | 1.0 | Vacuum | 714 |
| 30 | 450 | 1670 | 1.0 | Ar | 708 |

*Control catalyst—no CO treatment or heat treatment.
[a]Starting at 1650° F.
[b]No carbon deposited before heat treatment (i.e., no CO treatment).
[c]200° F./hr up to 1650° F.; 400° F./hr from 1650° F. to 1900° F.

Although we started counting time at 1650° F, it is believed that benefits probably start to accrue at about 1500° F. Temperatures in excess of about 2250° F may produce a degree of thermal sintering that virtually nullifies any benefits produced by the heat treatment. With this in mind, and based upon our test results and other experience, it is estimated that a heat treatment within the temperature range of 1500° F to 2250° F for from one-half hour to six hours will be beneficial. Of course, lower maximum temperatures and slower heating rates will require longer heat treatment times than higher maximum temperatures and faster heating rates. Raising the temperature too quickly can cause oxidation of the carbon support due to volatilization of impurities before they have had a chance to escape from the carbon particles. For this reason it is recommended that the rate of heating should not exceed about 600° F per hour. Our data indicates that a preferred heat treatment should be within the temperature range of 1650° F to about 1760° F for from three-quarters to one and one-half hours.

Based on our experimental testing it was found that the high temperature heat treatment step improves the catalyst in two major respects. First, recrystallization of the platinum during use of the electrode in a fuel cell is reduced even beyond that which is obtained by simply depositing the porous carbon on the platinum crystallites without afterward subjecting the catalyst to a high temperature heat treatment. Second, the initial activity of the platinum catalyst (i.e., before it is used in the fuel cell) is increased. The benefit of that initial increase is retained throughout use of the catalyst.

Initially it was attempted to obtain reduced platinum recrystallization using a high temperature heat treatment but without first depositing carbon on the platinum crystallites. These tests were not particularly successful due to excessive thermal sintering (i.e., increasing of the platinum particle size) caused by the high heat treatment temperatures. With regard to the present invention it is theorized that the porous carbon deposits significantly slow down the migration rate of the platinum crystallites during the high temperature heat treatment; and as the platinum crystallites slowly move over the surface of the carbon they are able to find suitable natural defects in the surface of the carbon support Table V presents some catalyst surface area data for catalysts 19, 20, and 21 which were treated as indicated in Table IV. From the data presented in Tables IV and V we can make several observations. First, it is clearly seen that CO treatment (or other treatment for depositing porous carbon on the platinum crystallites) prior to the high temperature heat treatment step is critical to the present invention. Second, despite the great improvement in initial cathode potential as between catalyst 20 and catalyst 21, catalyst 21 still has a lower initial cathode potential than the untreated catalyst 19; yet, after only 100 hours of operation in a fuel cell, the surface areas of catalysts 19 and 21 are almost the same. Given additional time in the fuel cell, the catalyst 21 will most likely exceed the performance and surface area of the untreated catalyst 19. Thus, in the long run benefits will be observed as a result of the specific treatment received by the catalyst 21. Third, the treatment of catalyst 25 illustrates that even though the heat treatment temperature is not particularly high, excessive time at that temperature results in a significant initial performance penalty. Finally, it can generally be concluded that better results are obtained using lower temperatures and less heat treatment time, such as the preferred temperature range of 1650° F to 1760° F for from three-quarters to one and one-half hours.

TABLE V

EFFECT OF CO TREATMENT PRIOR TO HEAT TREATMENT ON PLATINUM SURFACE AREA

| Catalyst # | Surface Area $m^2/gm$ | |
|---|---|---|
|  | Initial | 100 hours |
| [d]19 | 140 | 45 |
| [d]20 | 40 | 34 |
| [d]21 | 60 | 43 |

[d]See Table IV for treatment details.

Figure 2:
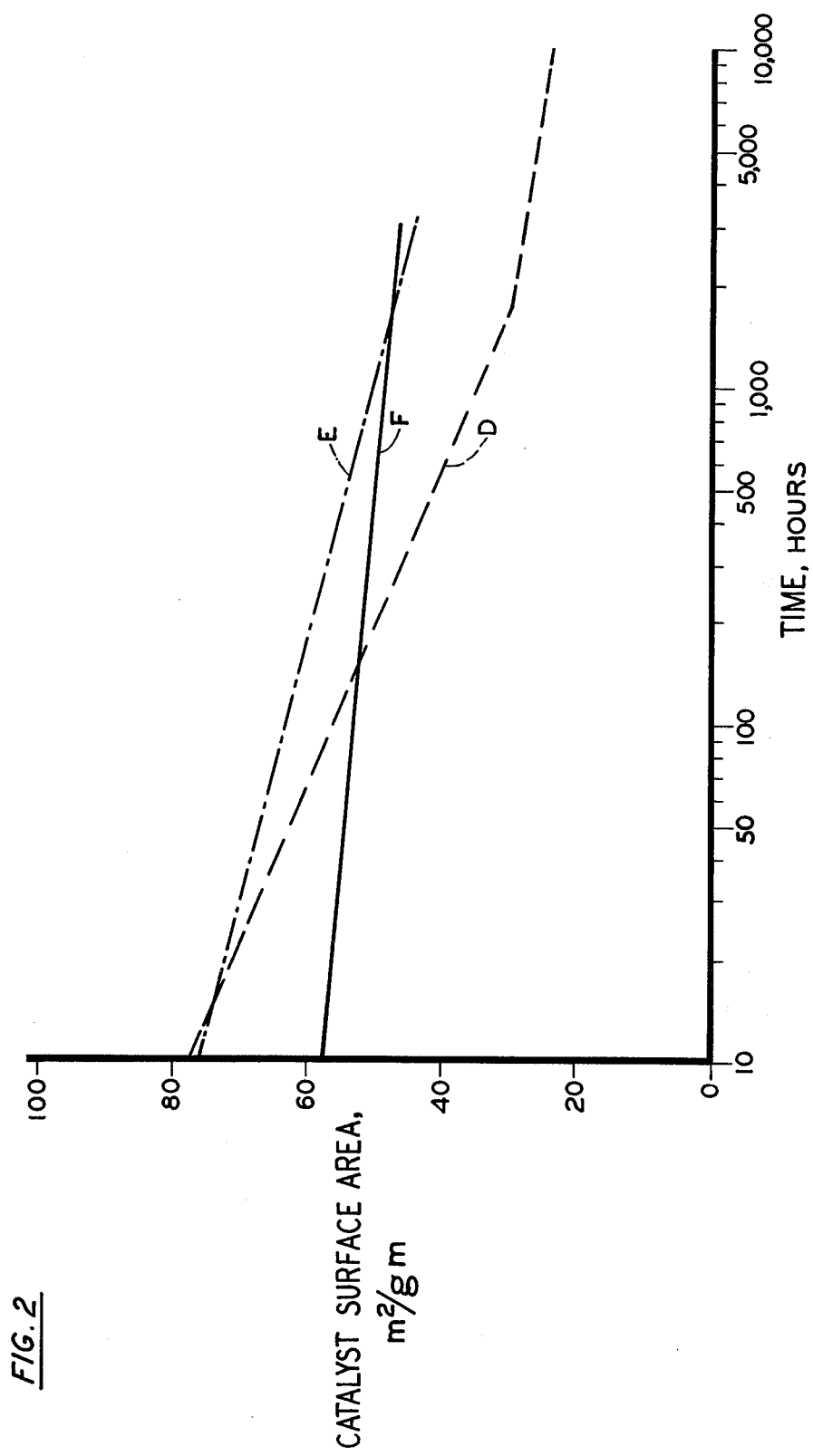
FIG. 2 is a graph illustrating that a catalyst made in accordance with the present invention loses surface area at a reduced rate when subjected to fuel cell conditions.

The graph of FIG. 2 illustrates that the present invention provides a significant improvement over catalysts which have had carbon deposited on the platinum crystallites but which were not thereafter heat treated according to the present invention. In FIG. 2 time spent at fuel cell conditions is plotted on the horizontal axis and average platinum surface area is plotted on the vertical axis. The curves are based on actual data. The curve labeled D is untreated platinum supported on carbon catalyst. The curve labeled E is a catalyst which was the same as the catalyst represented by the curve D except that porous carbon has been deposited on and around the platinum crystallites in accordance with the carbon monoxide method hereinabove described. Catalyst E was not, however, subjected to a high temperature heat treatment in an inert atmosphere. The curve labeled F is a catalyst which has been CO treated and then subjected to the high temperature heat treatment according to the method of the present invention. That is, it is for a catalyst identical to the catalyst represented by the curve E but which was also subjected to a high temperature heat treatment in an inert atmosphere.

It can be seen that catalysts D and E start out with approximately the same platinum surface area, which is greater than the platinum surface area of catalyst F. In all cases platinum surface area decreases during fuel cell operation; however, the surface area of catalyst F decreases at a slower rate than either of the other catalysts. After about 200 hours of fuel cell operation the platinum surface area of catalyst F exceeds the surface area of catalyst D. After about 2000 hours of fuel cell operation the platinum surface area of catalyst F also exceeds the platinum surface area of catalyst E. This partially explains the improved performance of the fuel cell using the catalyst of the present invention.

The graph of FIG. 3 is also based on experimental data and demonstrates that aside from the reduced recrystallization rate of the platinum, at least initially the platinum is in and of itself more active as a result of the present invention. In this graph time in the fuel cell is again plotted on the horizontal axis and catalyst activity in terms of fuel cell performance at 200 amps/ft$^2$ is plotted on the vertical axis. It is immediately noted that the activity of the catalyst made according to the present invention (curve H) is initially and always higher than the activity of the untreated catalyst (curve G) despite the fact that it initially has a smaller platinum surface area (see FIG. 2). It is believed that even if after a long period of use the catalysts of curves G and H end up having the same area (which is not the case) the activity of the catalyst represented by curve H will still be higher than that of the untreated catalyst.

Although the invention has been shown and described with respect to preferred embodiments thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. A method for improving a catalyst of platinum crystallites supported on carbon comprising the steps of depositing carbon on and around the supported platinum crystallites and then heating the catalyst in an inert atmosphere or vacuum to within the temperature range of 1500° F to 2250° F and holding the temperature within said range for one-half to six hours.

2. The method according to claim 1 wherein said temperature range is from 1650° F to 1760° F and the temperature is held within said range for three-quarters to one and one-half hours.

3. The method according to claim 1 wherein said step of depositing carbon comprises the step of heating the catalyst in the presence of carbon monoxide gas to decompose said carbon monoxide and deposit porous carbon on and around said supported platinum crystallites.

4. The method according to claim 3 wherein the step of heating the catalyst in the presence of carbon monoxide gas includes heating to within the temperature range of 500° F to 1200° F and holding the temperature within that range for from one to sixty minutes.

5. The method according to claim 3 wherein the step of heating the catalyst in the presence of carbon monoxide gas includes heating to within the range of 500° F to 800° F and holding the temperature within that range for from five to thirty minutes.

6. A catalyst comprising small platinum crystallites supported on carbon, and including porous carbon deposited on and around said crystallites, said catalyst having been subjected to heating in an inert atmosphere of vacuum within the temperature range of 1500° F to 2250° F, the temperature being held within said range for one-half to six hours.

7. The catalyst according to claim 6 wherein said porous carbon deposits have been applied by the step of heating the catalyst without said deposits in the presence of a carbonaceous component which decomposes to form said porous carbon deposits on and around said platinum crystallites.

8. The catalyst according to claim 6 wherein said temperature range was 1650° F to 1760° F, the temperature having been held within said range for three-quarters to one and one-half hours.

9. The catalyst according to claim 7 wherein said carbonaceous component was carbon monoxide and the step of heating in the presence of said carbonaceous component included heating to within the temperature range of 500° F to 1200° F and holding the temperature within the range for from one to sixty minutes.

10. A fuel cell electrode including an improved catalyst comprising small platinum crystallites supported on carbon particles, said crystallites having porous carbon deposited thereon and therearound, said catalyst with said porous carbon deposits having been heated in an inert atmosphere or vacuum within the temperature range of 1500° F to 2250° F, the temperature having been held within said range for one-half to six hours.

11. The fuel cell electrode according to claim 10 wherein said temperature range was 1650° F to 1760° F, the temperature having been held within said range for three-quarters to one and one-half hours.

12. The fuel cell electrode according to claim 10, said porous carbon having been deposited by heating the platinum supported on carbon catalyst without said carbon deposits in the presence of carbon monoxide gas to decompose said carbon monoxide and deposit porous carbon on and around said supported platinum crystallites.

13. The fuel cell electrodes according to claim 12 wherein heating in the presence of carbon monoxide gas included heating to within the temperature range of 500° F to 1200° F and holding the temperature within that range for from one to sixty minutes.

14. The fuel cell electrodes according to claim 12 wherein heating in the presence of carbon monoxide gas included heating to within the temperature range of 500° F to 800° F and holding the temperature within that range for from five to thirty minutes.

15. The fuel cell electrode according to claim 10 wherein said porous carbon deposits have been applied by the step of heating the catalyst without said deposits in the presence of a carbonaceous compound which decomposes to form said porous carbon deposits on and around said platinum crystallites.

* * * * *

UNITED STATES PATENT AND TRADEMARK OFFICE
CERTIFICATE OF CORRECTION

PATENT NO. : 4,137,373
DATED : January 30, 1979
INVENTOR(S) : Vinod M. Jalan and Calvin L. Bushnell It is certified that error appears in the above-identified patent and that said Letters Patent are hereby corrected as shown below:

Column 4, line 30   "E" should read --F--

Column 5, line 34   "672-583" should read --672-683--

Column 5, line 37   "min" should read --°F--

Column 5, line 38   "CO" should be deleted

Column 6, line 13   "CO" should be deleted

*Signed and Sealed this*

*Twenty-fifth* Day of *September 1979*

[SEAL]

Attest:

LUTRELLE F. PARKER

*Attesting Officer*    *Acting Commissioner of Patents and Trademarks*